March 17, 1925.
O. M. HOSTICK
THRUST BEARING
Filed Oct. 29, 1923
1,530,080
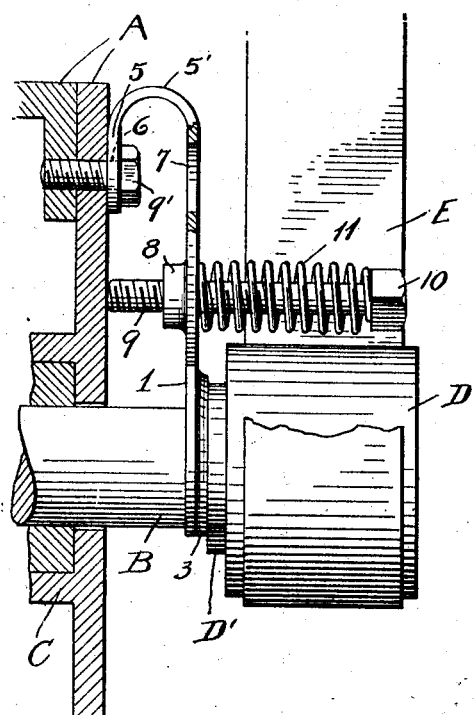
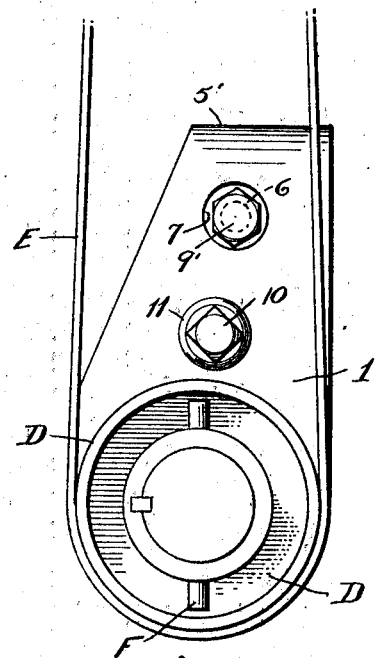
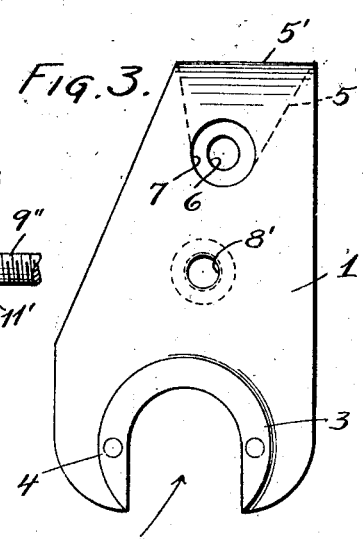
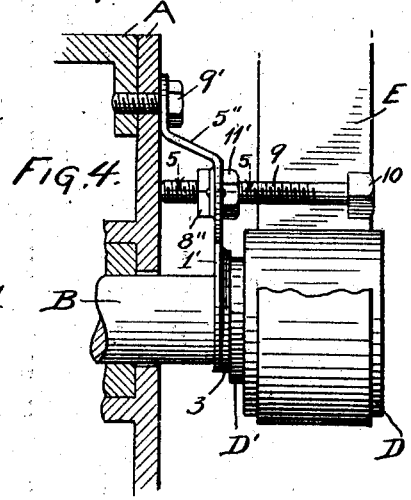
Inventor:
Oscar M. Hostick
BY: Frank H. Schwartz
ATTORNEY Patented Mar. 17, 1925.

1,530,080

UNITED STATES PATENT OFFICE.

OSCAR M. HOSTICK, OF ARAPAHOE, NEBRASKA.

THRUST BEARING.

Application filed October 29, 1923. Serial No. 671,468.

*To all whom it may concern:*

Be it known that I, OSCAR M. HOSTICK, a citizen of the United States, residing at Arapahoe, Nebraska, have invented certain new and useful Improvements in Thrust Bearings, of which the following is a specification.

The present invention relates generally to thrust bearings and more particularly to a thrust bearing for the crank shaft of Ford automobiles and tractors.

It is well known that in automobiles of this type, that considerable trouble arises from faulty ignition caused by endwise play of the crank shaft due to wear of its bearings. This end play causes the magneto to generate an unsteady current of electricity or none at all, which causes the engine to miss fire, and one object of my invention is to prevent such endwise play of the crank shaft in an old machine when its bearings have become worn, so that the magneto will have full, steady power, and the motor will run smoothly and with more power, and the life of the motor will be prolonged.

A further object of the invention is to provide a device which is inexpensive to manufacture, that may readily be attached to an engine in a few minutes by the simple use of an ordinary wrench, and that will be found to be reliable for the purpose intended.

With the above general objects in view, the invention consists essentially in the construction of parts hereinafter more particularly described and later pointed out in the appended claims, reference being had to the accompanying drawing in which:—

Figure 1 represents a side view, parts being broken away, of my invention applied.

Figure 2 is a front view of the same applied.

Figure 3 is a front view showing the device detached, the adjusting screw or bolt being removed.

Figure 4 is a side view similar to Fig. 1, of a modified form.

Figure 5 is a section on line 5—5 of Fig. 4.

Similar reference characters designate corresponding parts throughout the several figures of the drawing.

Referring to these figures, A, indicates the timing gear housing of a Ford motor through which the forward portion of the crank shaft B, has bearing at C. The crank shaft projects forward beyond the timing gear housing and receives the lower fan belt pulley D, upon which the fan belt E, runs. F, is the connecting pin, which is used to cooperate with the usual starting crank.

My improved thrust bearing is preferably made of any suitable metal, and comprises a main body portion 1, widened at the lower end and having a notch or opening 2, adapted to be slipped sidewise onto the crank shaft. Bordering the notch 2, is attached a raised portion 3, providing a smooth face 4, forming a bearing surface for the end of the hub D', of pulley D.

At the end opposite the notch 2, the body of the device has a narrowed end which is curved backward at 5' to form an attaching portion 5, the latter portion being provided with an opening 6, and the body 1, with an enlarged opening 7. The body is also provided with boss 8, having a threaded opening 8' therethrough, and through which a screw or bolt 9, is screwed. Surrounding this bolt is a coil spring 11, one end of which bears against the body 1, and the other end against the head 10, of the bolt in order to prevent the bolt from unscrewing from its adjusted position.

My improved thrust bearing is installed as follows:—The small stud bolt just above and to the right of the crank shaft is first removed; then the open end 2, of the thrust bearing is slipped in place between the fan pulley and the body of the motor. The stud bolt is now replaced by inserting it through the openings 6, and 7, and screwing it home by means of a wrench. The adjusting bolt is now turned till it presses against the front of the housing A, with sufficient force to eliminate all longitudinal play in the crank shaft, but not tight enough to cause heating of the bearing.

Figures 4 and 5 show a modified form bent as at 5''. The boss 8'' is a separate piece riveted on body 1' as shown in Fig. 5. Instead of a spring, a lock nut 11' is used. In both forms shown in Figs. 1 and 4, either a spring 11 or a lock nut 11' may be used.

My invention will be found to be easily and readily installed, and to bring about highly satisfactory results in causing the motor to run steadily and smoothly without misfiring. It also renders the motor easy to start, owing to the fact that the magnets and coils are in proper spaced relation necessary to get the best possible results.

From the foregoing description it will be obvious that my invention provides a simple, effective, and reliable thrust bearing, and one that will appeal to Ford owners.

I claim:—

1. A device of the class described, comprising a main body portion tapered on one side to form a narrowed upper end, the lower end being provided with a notch having a semicircular end adapted to fit over the forward end of the crank shaft of a Ford motor between the fan belt pulley and the timing gear housing, the upper end being curved rearwardly and provided with a bolt opening, and an adjusting bolt threaded through the body portion and adapted to be screwed against the front of said housing, for the purpose specified.

2. A device of the class described, comprising a main body portion, the lower end being provided with an open ended notch adapted to fit over the forward end of the crank shaft of a Ford motor between the fan belt pulley and the timing gear housing, the upper end being provided with means adapted to be attached to the timing gear housing, and thrust means intermediate the notch and the attaching end, adapted to engage the timing gear housing to cause the notched end to thrust against the pulley.

3. A device of the class described, comprising a main body portion, the lower end being provided with an open ended notch adapted to fit over the forward end of the crank shaft of a Ford motor between the fan belt pulley and the timing gear housing, the upper end being provided with means adapted to be attached to the timing gear housing, and adjustable thrust means intermediate the notch and the attaching end, adapted to engage the timing gear housing to cause the notched end to thrust against the pulley.

OSCAR M. HOSTICK.